(12) United States Patent
Khasnabish (10) Patent No.: US 6,795,395 B1
(45) Date of Patent: Sep. 21, 2004

(54) AUTOMATION OF CALL SETUP IN IP TELEPHONY FOR TESTS AND MEASUREMENTS

(75) Inventor: Bhumip Khasnabish, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/458,935

(22) Filed: Dec. 10, 1999

Related U.S. Application Data (60) Provisional application No. 60/154,441, filed on Sep. 17, 1999.

(51) Int. Cl.[7] ............................................. G01R 31/08
(52) U.S. Cl. ............................ 370/230; 370/468; 379/9
(58) Field of Search ................................ 370/468, 410, 370/389, 351–356, 464, 465, 431–433, 400, 401, 229, 230, 235, 236, 395.2; 379/1.01, 9, 15

(56) References Cited

U.S. PATENT DOCUMENTS

| | | | | |
|---|---|---|---|---|
| 6,064,653 A | * | 5/2000 | Farris | 370/237 |
| 6,330,236 B1 | * | 12/2001 | Ofek et al. | 370/369 |
| 6,411,679 B1 | * | 6/2002 | Khasnabish | 379/9 |
| 6,529,499 B1 | * | 3/2003 | Doshi et al. | 370/352 |
| 2002/0101866 A1 | * | 8/2002 | Miloslavsky et al. | 370/386 |

* cited by examiner

Primary Examiner—Wellington Chin
Assistant Examiner—Raj Jain
(74) Attorney, Agent, or Firm—Leonard C. Suchtya, Esq.; Joel Wall, Esq.; Foley, Hoag & Elliot LLP (57) ABSTRACT

A method and apparatus for automatically establishing a set of calls in a network is presented. A first device determines a maximum number of simultaneous calls that can be processed by a second device. The first device then determines a time interval necessary to allow calls to be established in a set of channels associated with the second device. Using the maximum number of simultaneous calls and the time interval previously determined, the set of calls are established.

10 Claims, 7 Drawing Sheets

| Inter call burst time gap (sec.) | No. of calls survived | Call setup time (sec.) | Delay vector (sec.) |
|---|---|---|---|
| 0 | 04 | 3.9 to 4.70 | {0, 0, 0, 0, 0, 0} |
| 1 | 08 | 3.4 to 10.2 | {0, 1, 2, 3, 4, 5} |
| 2 | 12 | 3.5 to 10.2 | {0, 2, 4, 6, 8, 10} |
| 3 | 15 | 3.5 to 10.2 | {0, 3, 6, 9, 12, 15} |
| 4 | 18 | 3.5 to 10.2 | {0, 4, 8, 12, 16, 20} |
| 5 | 19 | 3.5 to 10.2 | {0, 5, 10, 15, 20, 25} |
| 6 | 24 | 3.5 to 10.2 | {0, 6, 12, 18, 24, 30} |

FIG. 7

AUTOMATION OF CALL SETUP IN IP TELEPHONY FOR TESTS AND MEASUREMENTS

RELATED APPLICATION

This application claims the benefit of U.S. Provisional Application No. 60/154,441, filed Sep. 17, 1999, the disclosure of which is expressly incorporated herein by reference in its entirety.

FIELD OF THE INVENTION

The present invention relates to the field of IP telephony. More particularly, the invention relates to an apparatus and method for automating call setup in IP telephony.

BACKGROUND OF THE INVENTION

Packet networks, such as the Internet, are increasingly being used in conjunction with traditional circuit-switched networks to process telephone calls. This use of packet networks to process telephone calls is more commonly known as IP telephony.

In IP telephony, a call is usually established in multiple stages. In the first stage, an ingress or call-originating Internet Protocol—public switched telephone network (IP-PSTN) gateway is accessed. If the IP-PSTN gateway has enough digital signal processing (DSP) channels and processing capacity, and the backbone network can support, for example, one T1-Channel Associated Signaling (T1-CAS) port's worth of calls, 24 voice connection attempts should be able to be simultaneously started.

It appears, however, that most of the currently available IP-PSTN gateways can not handle all 24 simultaneous connection requests. Accordingly, there is presently a need for a system or process for effectively automating call setup in IP telephony.

SUMMARY OF THE INVENTION

A method consistent with the present invention provides for automatically establishing a set of calls in a network. A first device determines a maximum number of simultaneous calls that can be processed by a second device. The first device then determines a time interval necessary to allow calls to be established in a set of channels associated with the second device. Using the maximum number of simultaneous calls and the time interval previously determined, the set of calls are established.

An apparatus consistent with the present invention automatically establishes a set of calls. The apparatus provides means for determining a maximum number of simultaneous calls that can be processed by a device, means for determining a time interval necessary to allow calls to be established in a set of channels associated with the device, and means for establishing the set of calls using the maximum number of simultaneous calls and the time interval.

Another apparatus consistent with the present invention automatically establishes a set of calls. The apparatus includes a memory having program instructions and a processor responsive to the program instructions. The processor determines a maximum number of simultaneous calls that can be processed by a device, determines a time interval necessary to allow calls to be established in a set of channels associated with the device, and establishes the set of calls using the maximum number of simultaneous calls and the time interval.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Methods consistent with the present invention automatically establish a set of calls in IP telephony. In order to effectively use the presently available IP-PSTN gateways, a maximum number of simultaneous incoming call requests that an ingress gateway can handle, such that connection setup is allowed and bidirectional conversation can proceed smoothly, is determined. The inter-call-burst time gap that is necessary to allow calls to be established in every channel of the gateway is also determined. The maximum number and time gap are used to setup a prespecified number of calls in multiple stages.

Figure 1:
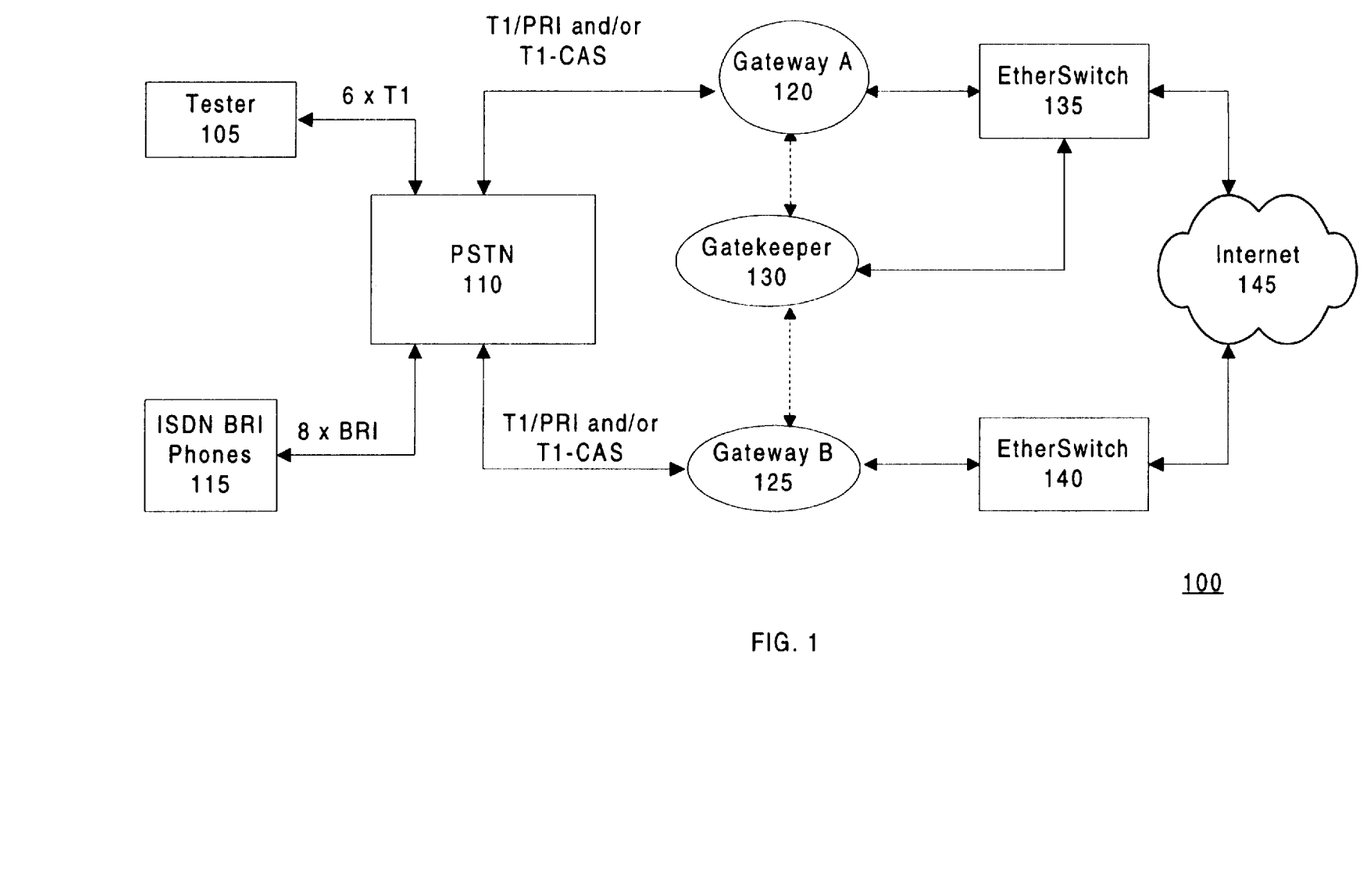
FIG. 1 is a diagram of an exemplary network environment in which a technique consistent with the present invention may be implemented.

FIG. 1 is a diagram of an exemplary network environment 100 in which methods consistent with the present invention may be implemented. Tester 105 is a telecommunications tester that can be used to test the capabilities of various aspects of network 100. Tester 105 can send both voice and non-voice signals (i.e., a string of digits and characters such as # or *) over the network 100 for controlling and testing a system or device under test. Tester 105 is microprocessor based and preferably makes use of a multi-tasking operating system such as Windows NT or Unix. Multi-tasking is necessary because tester 105 needs to be able to launch, control, and store information about multiple simultaneous telephone test calls. For example, tester 105 can be used to generate and analyze bulk phone calls, including measuring the answer time, response time at various stages of call progress, and the time to hear the ring-back tone at the call originating side. Tester 105 typically includes at least one processor that schedules and controls the execution of test scripts running on various channels (i.e., voice channels, control channels). Tester 105 also typically includes a database or other storage means for storing test scripts, test script input data, and test results data. Tester 105 can be, for example, a Hammer telecommunications system tester that uses test scripts written in Hammer visual basic (HVB) language.

Tester 105 is connected to public switched telephone network (PSTN) 110 via up to, for example, six T1lines. Alternatively, tester 105 could be coupled to a switch that is used to emulate a PSTN (e.g., Madge Access Switch) or a private branch exchange (PBX). A plurality of integrated services digital network basic rate interface (ISDN BRI) phones 115 are also connected to PSTN 110 via a plurality of BRI lines. ISDN BRI phones 115 can be used to check the sanity of call progress and human perception based audio quality assessment or measurement. Call progress sanity check refers to hearing the generation of appropriate tones (i.e., a string of DTMF digits, dial tone, ring-tone, etc.) or play-out of an appropriate interactive voice response (IVR) message, etc.

PSTN 110 is also connected to gateway A 120 and gateway B 125 via T1-Channel Associated Signaling (T1-CAS) and/or T1-Primary Rate Interface (T1-PRI) connections. These connections are used to support calls from ISDN BRI phones 115 or from emulated analog phones in tester 105. Note that it is possible to connect more than two gateways to PSTN 110. Gateway A 120 and gateway B 125 are commercially available IP-PSTN gateways such as Siemens' EE2000, Linkon's LinkNet, or Lucent's ITS-SP IP telephony gateways. In one embodiment, gateway A 120 and gateway B 125 support one to four T1 ports per line card for interfacing to the PBX or PSTN network (e.g., PSTN 110), and one or two auto-sensing 10/100 BT Ethernet ports for interfacing to the IP network (e.g., Internet 145) via a LAN. In the network depicted in FIG. 1, gateway A 120 can be considered the near-end (call originating) gateway, and gateway B 125 can be considered the far-end (call terminating) gateway. Alternatively, the two gateways could switch roles. Gateway A 120 and gateway B 125 are typically connected to two different IP sub-nets that are interconnected via an IP router, e.g., Internet 145. However, it is also possible to connect the two gateways using the same IP sub-net (i.e. both gateways are connected to the same EtherSwitch). Gateway A 120 and gateway B 125 are both logically connected to a gatekeeper 130. Gatekeeper 130 usually runs on a WindowsNT server and is physically connected to the same IP sub-net to which gateway A 120 is connected (note that gatekeeper 130 could alternatively be physically connected to the same IP sub-net that gateway B 125 is connected to). Gatekeeper 130 performs registration, authentication and status monitoring functions, when a call establishment request arrives. It is also possible for gatekeeper 130 to maintain call detail record (CDR) files.

Gateway A 120 and gateway B 125 are connected to EtherSwitch 135 and EtherSwitch 140, respectively, via Ethernet links (i.e., 10/100 BT). EtherSwitch 135 and EtherSwitch 140 provide for the connection of multiple sub-nets to a central switch or router. Within each EtherSwitch, parallel switching allows for the simultaneous transport of multiple packets across the switch. EtherSwitch 135 is also connected to gatekeeper 130. EtherSwitch 135 and EtherSwitch 140 are both connected to the IP router, e.g., Internet 145. Alternatively, EtherSwitch 135 and EtherSwitch 140 could be connected to an IP network impairment emulator to emulate the impairments that the Internet brings to real-time communications (e.g., voice).

When placing a call in network 100, appropriate dialing plans and PSTN (e.g., a Madge switch) configurations are used to make connections from one channel of tester 105 or an ISDN BRI phone to the other channel of tester 105 or another ISDN BRI phone either directly through PSTN 110, or using one or two gateways. In this manner, calls can be made over either only the PSTN 110 or through the Internet 145. Note that Internet 145 can also be a cluster or mesh of internet routers.

In IP telephony, a call is usually setup in multiple stages. In the first stage, a phone number is dialed to reach a near-end or call-originating IP-PSTN gateway (i.e., gateway A 120). The next two stages involve user identification through delivering an x-digit user-id and then a y-digit personal identification number (PIN) to an authentication and/or billing server (i.e., gatekeeper 130). Then the user is provided with a last stage dial tone and is allowed to dial a destination phone number provided that the authentication is successful. Note that it is also possible to have single-stage call setup in IP telephony, and the technique of the present invention can efficiently handle either single-stage or multi-stage call setup.

The actual number of voice channels that can be used for conversation depends on the total number of DSP channels available in a given gateway. For example, if 16 DSP channels are supported per remote access service (RAS) card, a total of six (=96/16) such cards would be needed to support the four T1 ports (4 T1 ports×24 possible voice conversations=96 voice conversations). Note that each T1 port can support 24 voice conversations. Alternatively, if 24 DSP channels are supported per RAS card, a total of four (=96/24) such cards would be needed to support the four T1 ports.

Assuming that a given gateway has enough DSP channels and processing capacity and can support one T1 CAS port's worth of voice conversation, 24 voice connection attempts should be able to be simultaneously started. Alternatively, the gateway could use ISDN primary rate interface (ISDN PRI) ports. In that case, 23 simultaneous voice connection attempts should be able to be supported (note that other types of ports could also be used depending on what the gateway supports). Due to the fact that most of the presently available IP-PSTN gateways cannot actually handle all of the simultaneous connection requests, it is necessary to control the number of calls started simultaneously.

Controlling Process

Figure 2:
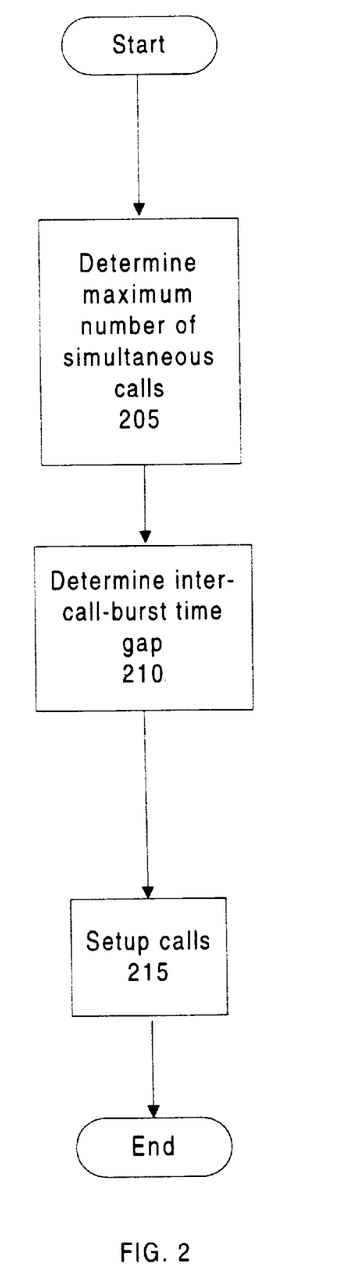
FIG. 2 is an exemplary flowchart of a process for automatically setting up calls in a manner consistent with the present invention.

Methods consistent with the present invention can be used to automatically setup calls such that the number of simultaneous connection attempts is controlled, and all of the calls can be properly processed. One implementation uses test scripts written in HVB language and run by tester 105. FIG. 2 shows a flowchart of an exemplary method for automating call setup in accordance with the present invention. First, the maximum number of simultaneous call connection attempts that gateway A 120 (assuming that gateway A 120 is the ingress or near-end gateway) can actually process must be determined (step 205). This determination is made using the methods described in connection with FIG. 3 or FIG. 4.

Once this number has been determined, the next step is to determine the inter-call-burst time gap that is necessary to allow all of the calls to be processed (step 210). Due to limitations in software and hardware of both gatekeeper 130 and IP-PSTN gateways such as gateway A 120, there must be a delay between different groups of simultaneous calls. This delay is known as the inter-call-burst time gap. The number of simultaneous calls that are made at any given time is known as the call burst size. Without an inter-call-burst time gap, there is a greater chance that call attempts will either fail or be rejected. One factor that may change the amount of inter-call-burst time gap needed is the number of stages involved in call setup. Generally, the inter-call-burst time gap can vary from 100 s of milliseconds to a few seconds.

In order to determine the inter-call-burst time gap, more emulated calls must be initiated. For example, a set of calls is first started. Next, a predetermined time interval is applied. After that, another set of calls is started. If there are no errors using the predetermined time interval, then the time interval is decreased by a predetermined amount and yet another set of calls is started. This process would continue until an error is detected. At that point, the last time interval not to have an error is saved as the inter-call-burst time gap. If there were errors after the initial predetermined time interval was applied, then instead of decreasing the time interval, it could be increased. Sets of calls are applied alternately with the time interval until there are no errors. The first time interval with no errors is then saved as the inter-call-burst time gap. Note that this method of determining the inter-call-burst time gap could be performed during normal processing of tester 105 or outside of normal processing (e.g., a user might use trial and error "manually").

Once the inter-call-burst time gap has been determined, the calls are ready to actually be setup (step 215). The objective of the call setup is to utilize the values that were determined earlier (e.g., maximum number of simultaneous calls, inter-call-burst time gap) in order to stagger the calls or connection requests so that the call attempts are successful on all of the available channels (i.e., 24 channels for one T1 link). For example, the maximum number of simultaneous calls that the system can handle is actually started. After which, the inter-call-burst time gap is asserted. This sequence is then repeated, as needed. If multiple (say 'a') T1 links are available from the PSTN network to the ingress gateway, then an attempt should be made to make successful calls on all (a×24) channels.

Determining the Number of Calls

Figure 3:
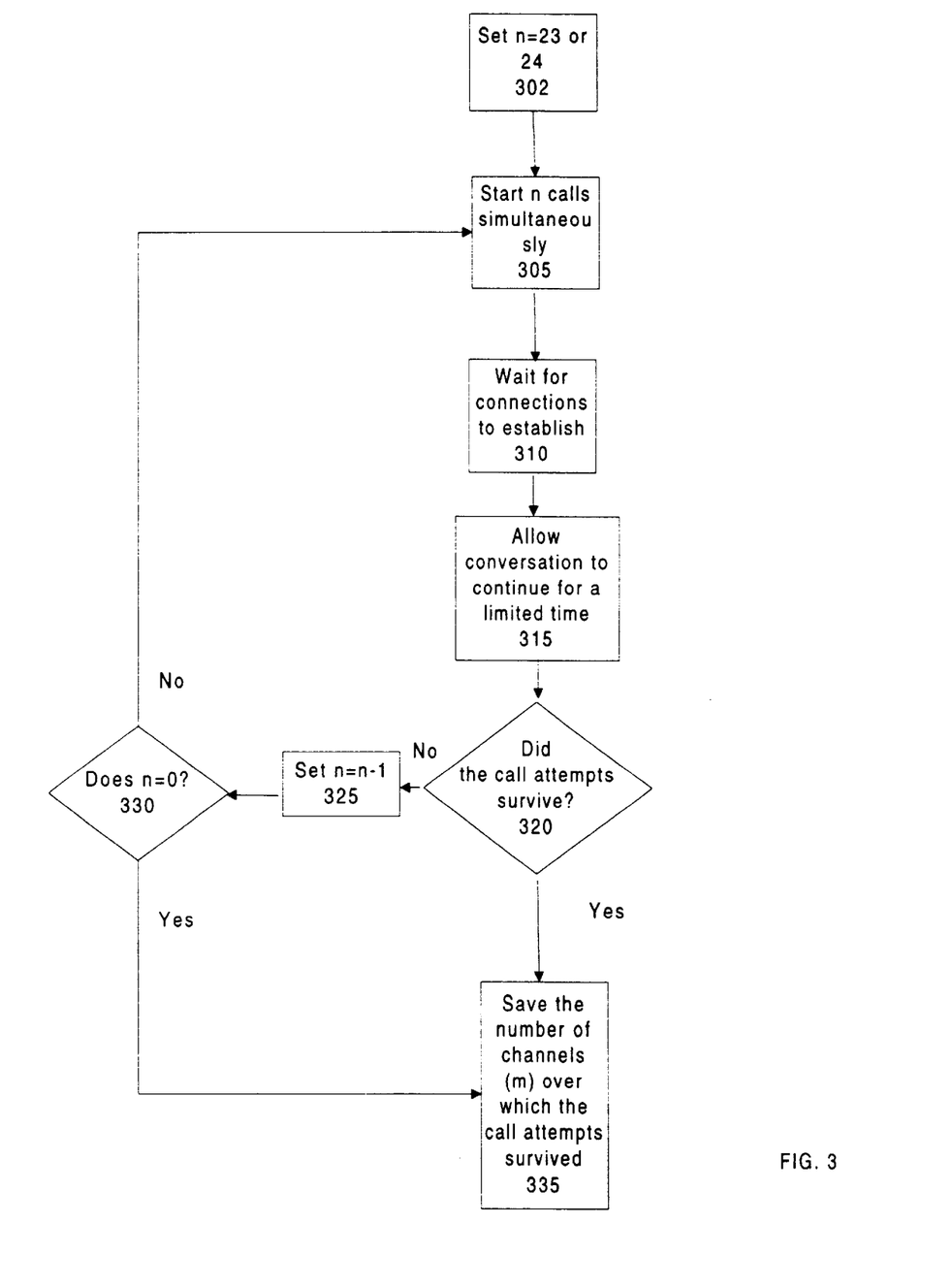
FIG. 3 is an exemplary flowchart of a process for determining the maximum number of calls that can be started simultaneously without any inter-call gap time in a manner consistent with the present invention.

FIG. 3 shows a flowchart of a method for determining the number of calls that can be started simultaneously so that successful connections are established. Using tester 105, a number (n) of calls to be started simultaneously is set to an initial value (step 302). In one embodiment, n is the number of calls that gateway A 120 should be able to handle (e.g., 24 for T1-CAS ports; 23 for ISDN PRI ports). Once n is set, tester 105 proceeds to actually start n calls simultaneously (step 305). Next, there is an associated delay as the call requests attempt to establish the connections (step 310). One can visually monitor the status of the call requests using a channel monitor that may be included in tester 105. Successful calls or connections are typically indicated by green, and failed connections are typically indicated by red in the channel status indicator. Visual monitoring can be used to "manually" control the determination of the number of simultaneous calls (as opposed to letting tester 105 completely control the determination), or it can be solely used for the convenience of the caller (i.e., to give the caller an idea of whether or not all of the connections are established even when tester 105 is completely automating the process). After all of the connection attempts have either been established or failed, there is another delay as the emulated bidirectional conversation is allowed to continue for a period of time (step 315). This period of time may be set for the length of a typical phone call (i.e., three to five minutes), or higher as per the requirements. At the end of the time period, tester 105 makes a determination as to whether or not call attempts survived on all n channels (step 320). If all of the call attempts did survive, then the number (m) of channels over which the call attempts survived is stored in memory (step 335).

If all of the call attempts did not survive, then tester 105 must continue the process. The value of n is reduced by one (step 325). Next, a determination is made as to whether or not n equals zero (step 330). If n does equal zero, then the call attempts survived on none of the channels, and zero needs to be saved as the number (m) of channels over which the call attempts survived (step 335). If n does not equal zero, then the whole process is restarted using the updated value of n (step 305). In this manner, the number of simultaneous calls that an IP-PSTN gateway, such as gateway A 120, can process can be determined.

Figure 4:
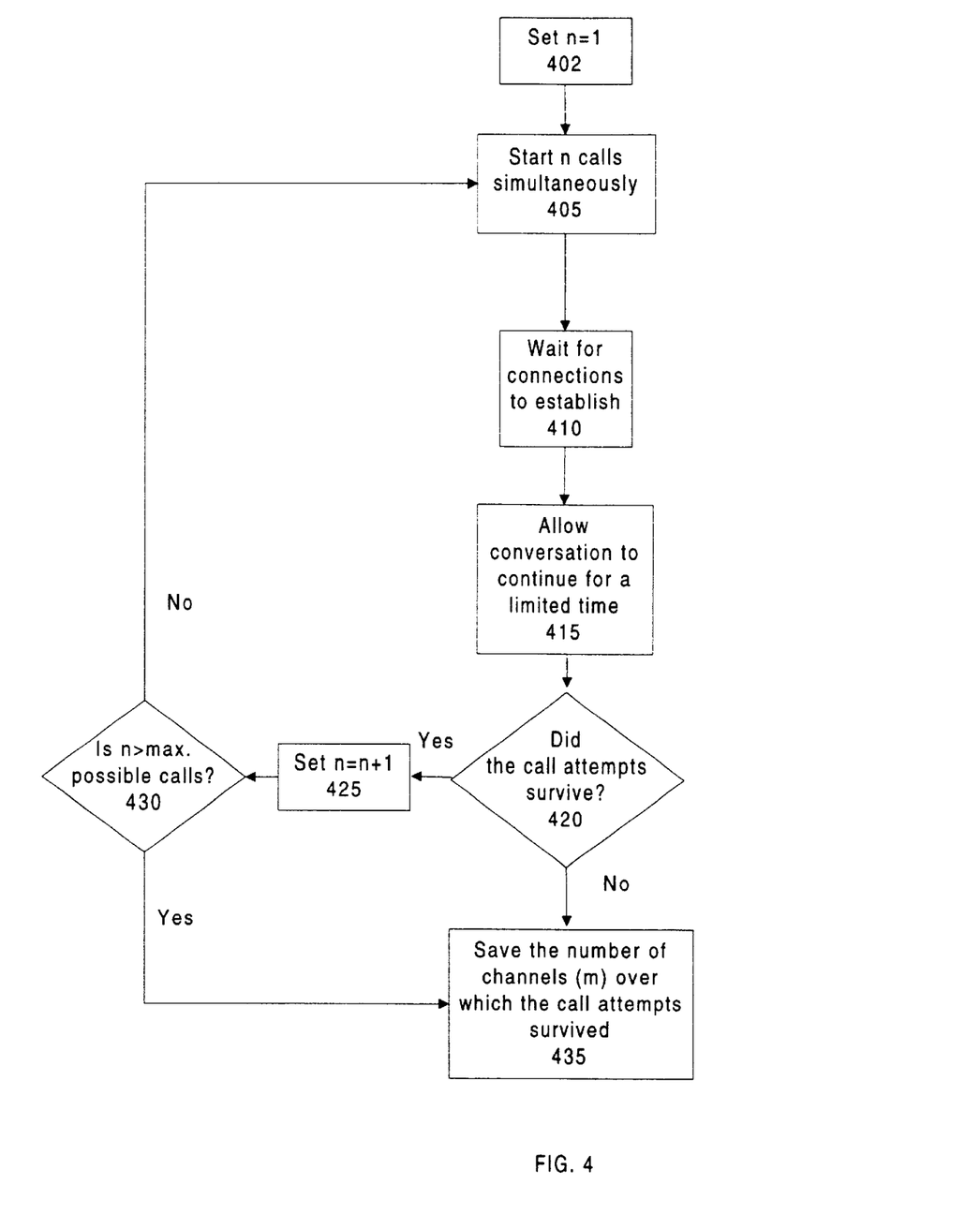
FIG. 4 is an exemplary flowchart of another process for determining the maximum number of calls that can be started simultaneously without any inter-call gap time in a manner consistent with the present invention.

FIG. 4 shows a flowchart of another exemplary method for determining the number of calls that can be started simultaneously. This method is essentially the same as the method depicted in FIG. 3. There are just some minor changes. At the beginning of this method, tester 105 only starts one call (e.g., the value of n is one) (step 402). Aside from the initial value of n, steps 405, 410, and 415 occur in a manner similar to steps 305, 310, and 315 of FIG. 3. When the determination as to whether or not the call attempts survived on all n channels occurs (step 420), there is a slight difference. If all of the call attempts did not survive, that means that tester 105 went a step too far and the number (m) of channels over which the call attempts survived must be stored (step 435). If all of the call attempts did survive, then instead of subtracting one from the value of n, one must be added to the value of n (step 425). After which, a determination is made as to whether or not n has exceeded the maximum number of possible simultaneous calls (e.g., 24 for T1-CAS ports; 23 for ISDN PRI ports) (step 430). If n is greater than this maximum, then gateway A 120 can handle the maximum number of possible simultaneous calls, and this number is stored as the number (m) of channels over which the call attempts survived. If n is less than or equal to the maximum number, then the whole process is restarted using the updated value of n (step 405).

Call Setup Process

Figure 5:
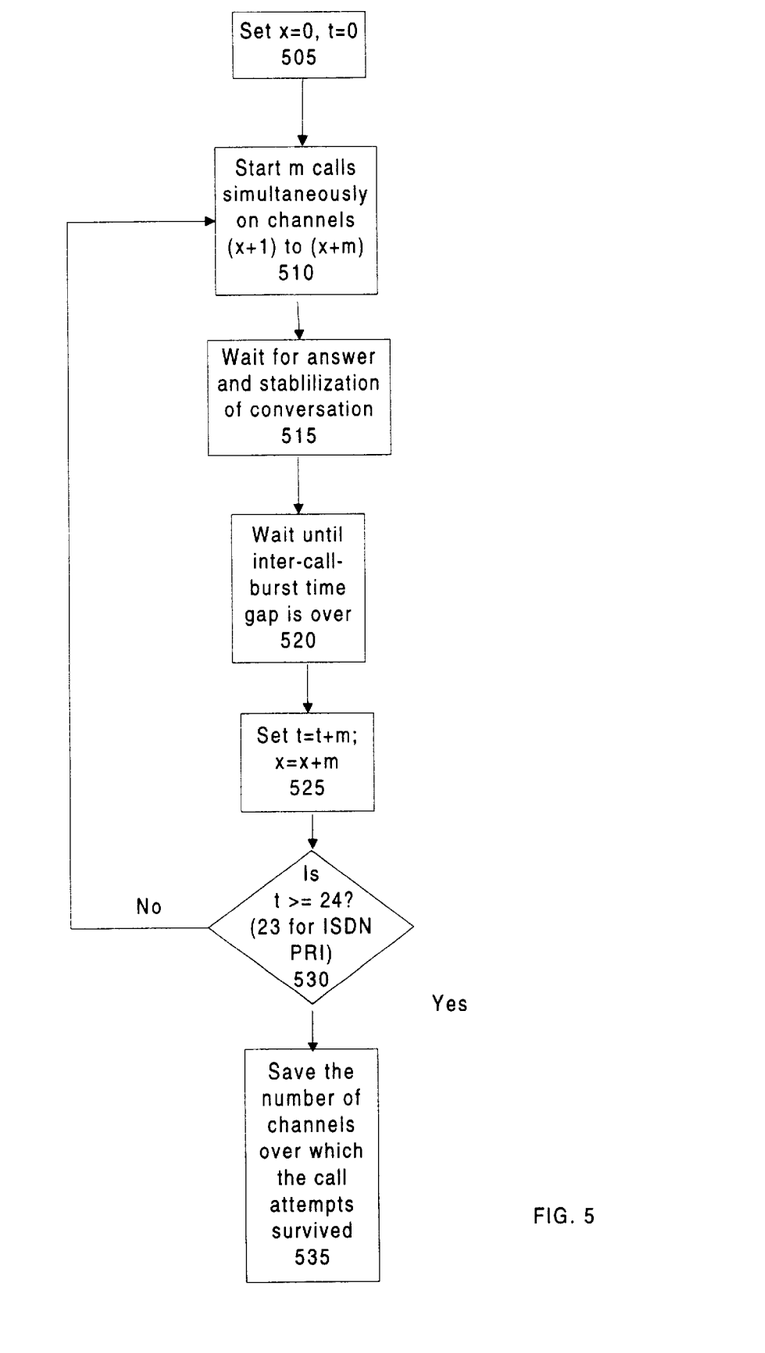
FIG. 5 is an exemplary flowchart of a process for staging calls in a manner consistent with the present invention.

FIG. 5 shows a flowchart of an exemplary method for setting up the calls in accordance with step 215 of FIG. 2. The first step is to set two variables, x and t, to zero (step 505). The variable x is a reference point used by tester 105 so that it starts calls on the correct channels. The variable t is a tally of the number of calls that have been established. The next step is to start m calls simultaneously on channels (x+1) to (x+m) of tester 105 (step 510). Recall that m is the maximum number of simultaneous calls that was determined using the method of either FIG. 3 or FIG. 4. Initially, calls are started on the first m channels ((0+1=1) to (0+m=m)). In subsequent iterations, calls are started on different channels. Note that it is also possible to use a pre-call wait. A pre-call wait may be desirable to use in order to overcome the problems presented by limited DSP resources. The pre-call wait is similar to the inter-call-burst time gap and determines the amount of time the call-originating script will wait before actually making a connection attempt over a selected channel. Once the calls have been initiated, there is a delay as the system must wait until a remote or called party answers the call on all of the channels on which calls were attempted (step 515). The bidirectional conversation that occurs on the channels must also stabilize after the answer (step 515). By delaying processing until all of the designated channels have stabilized conversation on them, errors that may occur can be reduced. The method next causes a delay in time equivalent to the inter-call-burst time gap that was determined in the manner described above (step 520). This delay is needed due to the inherent limitations of the various hardware, software, and processing capacity of the components of the system.

After the inter-call-burst time gap has elapsed, it is safe to move on to the next set of channels if necessary. The variable t (total number of calls established) is recalculated as t=t+m, and the variable x is recalculated as x=x+m (step 525). In this manner, tester 105 can prepare to start calls on a set of channels that are different than the set of channels on which calls were previously started. Before calls can be initiated again, however, a determination is made as to whether or not the total number of calls established is greater than or equal to 24 (step 530). Note that if ISDN PRI ports were being used instead of T1 ports, then the threshold would be 23. Also note that the number of T1 ports being utilized in this example is one. If more than one T1 port were being used, then a corresponding increase in threshold number would occur (e.g., 48 for two ports, 72 for three ports, etc.). If the total number of calls established is greater than or equal to 24, then the number of channels over which the call attempts survived is stored, and the call is now considered as established (step 535). If the total number of calls established is still less than 24, then the next set of calls can be started beginning with the next m channels (step 510). This staggering or staging of call attempts continues until the call has been established.

Figure 6:
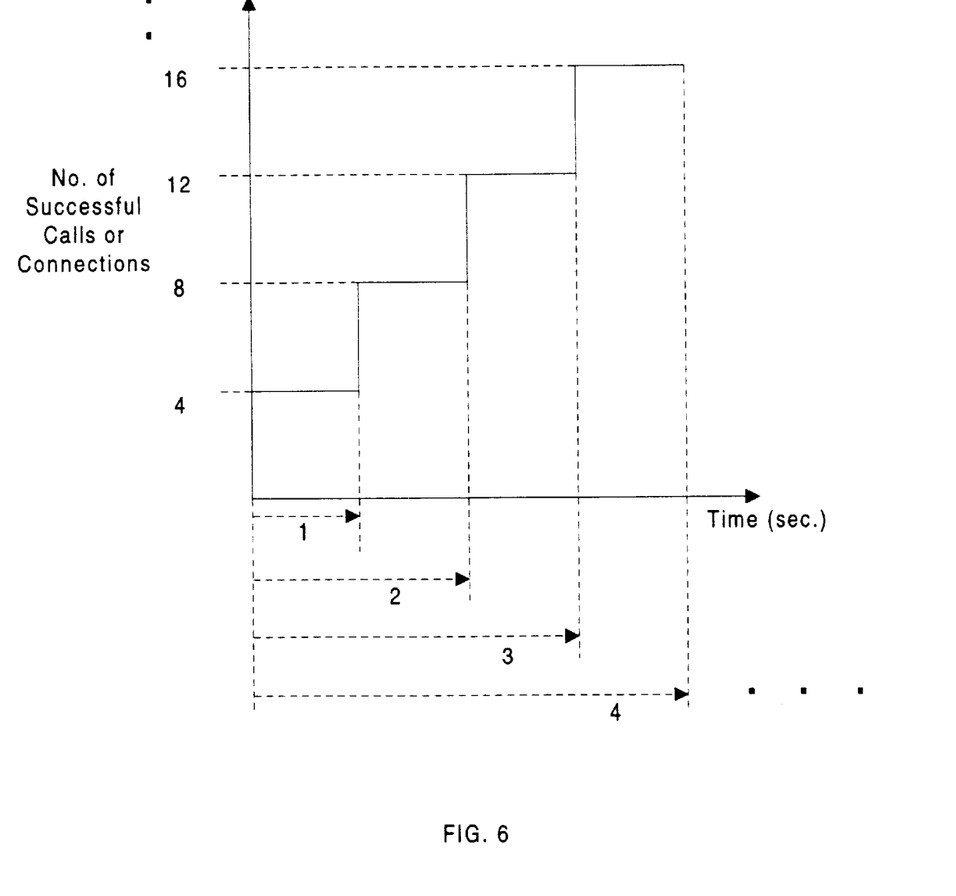
FIG. 6 is an exemplary graph of the staging of calls in a manner consistent with the present invention.

FIG. 6 shows an exemplary graph of the staging of calls as it occurs in the present invention. The x-axis represents the time that has elapsed during the call setup, and the y-axis represents the number of successful calls or connections during call setup. In the staging that is depicted in FIG. 6, four calls are started at a time, and a one second inter-call-burst time gap is added. In the case of one T1, there are 24 channels on which to start the calls or connection requests. The calls in the first four channels (e.g., channels 1–4) start at the same time as the script starts running on those channels. The calls in channels 5–8 start one second after the script starts running. The calls in channels 9–12 start two seconds after the script starts running. The calls in channels 13–16 start three seconds after the script starts running, and so on, until all of the calls have been started.

Figure 7:
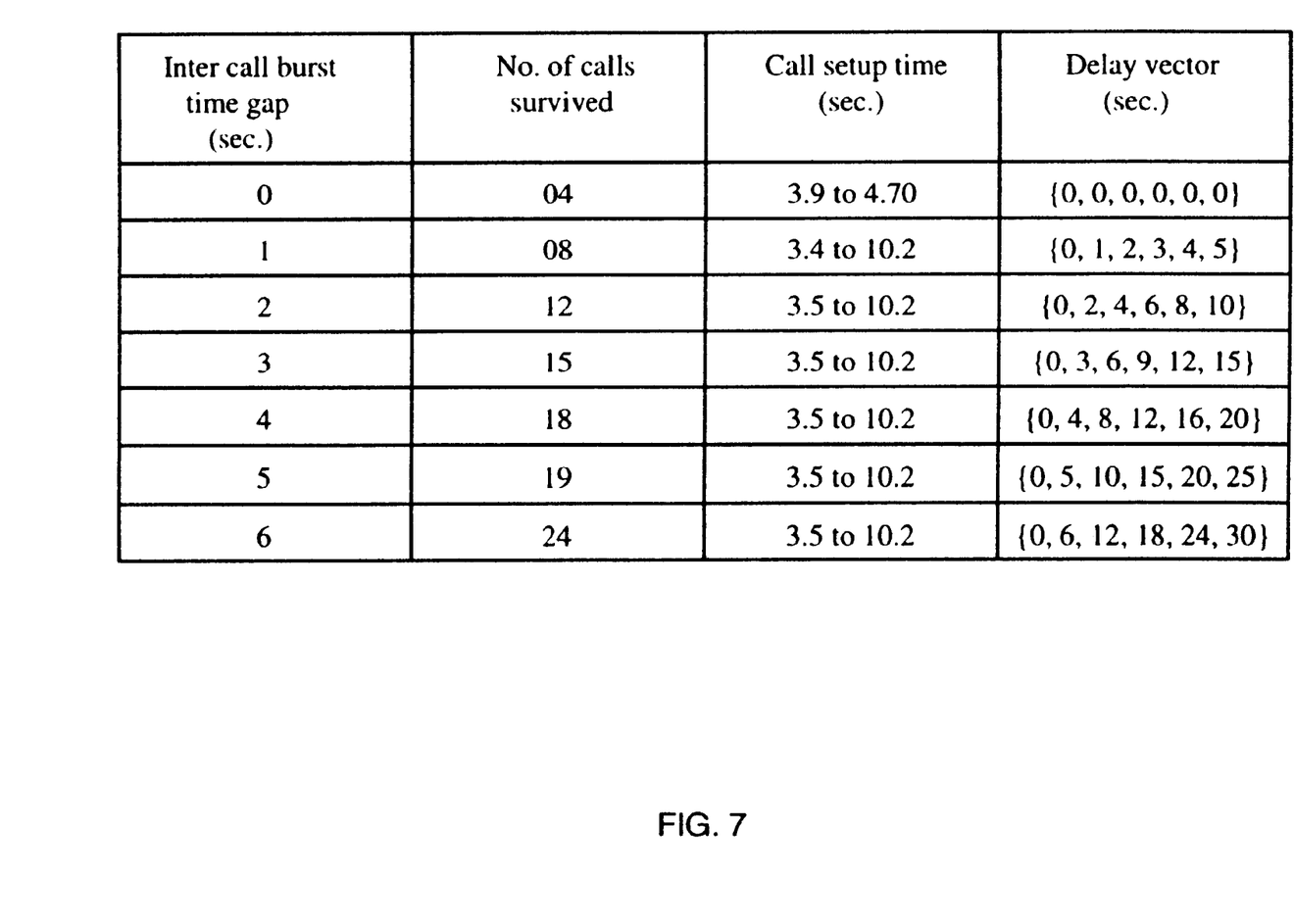
FIG. 7 is a table of results of a call setup automation experiment conducted using an apparatus and method designed in a manner consistent with the present invention.

FIG. 7 shows a table of results of a call setup automation experiment using type-A IP-PSTN gateways. The experiment was done using a setup similar to that shown in FIG. 1. One pair of T1 links were used between tester 105 and PSTN 110 (one making outgoing calls and the other receiving incoming calls). The first column of the table shows the different values of the inter-call-burst time gap that were used in the experiment. The second column shows the number of calls that survived for each different time gap. The third column shows the range of call setup times that were resulted for each time gap. The call setup time, in the context of this example, is the amount of time it takes until bidirectional conversation stabilizes. The fourth column shows the different delay vectors based on a given time gap. For example, if there is a time gap of two seconds, then a delay vector based on that time gap is {0, 2, 4, 6, 8, 10} (the numbers go up in two second increments). For the case of one set of T1 links between tester 105 and PSTN 110, 24 calls can be successfully established from gateway A 120 (ingress gateway), through PSTN 110, Internet 145, and gateway B 125 (egress gateway). For the experiment, the maximum number of calls that can be started simultaneously was found to be four using the method of FIG. 3. The value of the inter-call-burst time gap was then varied in order to determine what value would ensure establishment of all of the 24 calls. Note that the number of calls survived does not increase uniformly with an increase in the value of the inter-call-burst time gap. This can be attributed to the fact that the call processing capability of the DSP resources depletes faster than the rate at which the utilization of DSP resources increase. This seems to be true for many of the commercially available first-generation IP-PSTN gateways that were tested.

While the present invention has been described in connection with a preferred embodiment, many modifications will be readily apparent to those skilled in the art, and this application is intended to cover any adaptations or variations thereof. This invention should be limited only by the claims and equivalents thereof.

What is claimed is:

1. A method for automatically establishing a set of calls in a network comprised of at least two devices connected by channels comprising the steps, performed by a first device, of:

determining a maximum number of simultaneous calls that can be processed by a second device;

determining a time interval necessary to allow calls to be established in a set of channels associated with the second device; and     establishing the set of calls using the maximum number of simultaneous calls and the time interval.

2. The method of claim 1, wherein said step of determining a maximum number of simultaneous calls further comprises:

(a) sending n signals corresponding to call attempts simultaneously to n channels of the second device;

(b) establishing a number of connections between the first device and the second device over the n channels in response to the signals;

(c) suspending the connections after a predetermined period of time; and     (d) determining whether the call attempts survived on all n channels.

3. The method of claim 2, wherein said step of determining a maximum number of simultaneous calls further comprises:

decreasing n by one based on the determination that all of the call attempts did not survive; and     repeating steps (a)–(d).

4. The method of claim 3, wherein said step of determining a maximum number of simultaneous calls further comprises:

storing n based on the determination that all of the call attempts survived.

5. The method of claim 2, wherein said step of determining a maximum number of simultaneous calls further comprises:

increasing n by one based on the determination that all of the call attempts survived; and     repeating steps (a)–(d).

6. The method of claim 5, wherein said step of determining a maximum number of simultaneous calls further comprises:

storing n based on the determination that all of the call attempts did not survive.

7. The method of claim 1, wherein said establishing step further comprises:

(a) sending a number of signals corresponding to the maximum number of simultaneous calls to the second device;

(b) establishing a number of connections between the first device and the second device in response to the signals;

(c) waiting a period of time corresponding to the time interval;

(d) adding the number of connections to a total number of connections; and (e) determining whether the total number of connections is less than a total number of channels available from the first device to the second device.

8. The method of claim 7, wherein said establishing step further comprises:

repeating steps (a)–(e) based on the determination that the total number of connections is less than the total number of channels available at the second device; and storing a number of channels over which call attempts survived based on the determination that the total number of connections is greater than or equal to the total number of channels available at the second device.

9. A tester for automatically establishing a set of calls comprising:

means for determining a maximum number of simultaneous calls that can be processed by a device;

means for determining a time interval necessary to allow calls to be established in a set of channels associated with the device; and means for establishing the set of calls using the maximum number of simultaneous calls and the time interval.

10. A device for automatically establishing a set of calls, comprising:

a memory having program instructions; and a processor responsive to the program instructions to determine a maximum number of simultaneous calls that can be processed by a device, determine a time interval necessary to allow calls to be established in a set of channels associated with the device, and establish the set of calls using the maximum number of simultaneous calls and the time interval.

* * * * *